Aug. 29, 1933. G. A. LUTHER 1,924,449

VOTING MACHINE

Filed June 22, 1931 7 Sheets-Sheet 1

INVENTOR,
George A. Luther,
BY Hovey & Hamilton,
ATTORNEYS.

Aug. 29, 1933.   G. A. LUTHER   1,924,449
VOTING MACHINE
Filed June 22, 1931   7 Sheets-Sheet 2

Fig. 4

INVENTOR,
George A. Luther.
BY
Harvey & Hamilton,
ATTORNEYS.

INVENTOR,
George A. Luther.
BY Hovey & Hamilton,
ATTORNEYS.

Aug. 29, 1933.  G. A. LUTHER  1,924,449
VOTING MACHINE
Filed June 22, 1931  7 Sheets-Sheet 6

Fig. 8    Fig. 9

INVENTOR,
George A. Luther
BY
Hovey & Hamilton
ATTORNEYS.

Aug. 29, 1933.   G. A. LUTHER   1,924,449
VOTING MACHINE
Filed June 22, 1931   7 Sheets-Sheet 7

INVENTOR,
George A. Luther.
BY
Hovey & Hamilton
ATTORNEYS.

Patented Aug. 29, 1933

1,924,449

UNITED STATES PATENT OFFICE 1,924,449

VOTING MACHINE

George A. Luther, Kansas City, Kans.

Application June 22, 1931. Serial No. 545,882

15 Claims. (Cl. 235—55)

This invention relates to registering mechanism and particularly vote-registering and totaling apparatus usable wherever it is necessary to maintain an accurate account and progressive totals of the number of votes cast either for the individual candidate, the entire political party, or a grand total of all votes cast and recorded through the use of the voting machine.

The primary object of this invention is to provide a vote-registering apparatus embodying the above broad purposes and having incorporated therein a novel combination of unique parts to accomplish the results in an accurate and expeditious manner.

One of the objects of the invention is the provision of a voting machine having parts therein for the accomplishment of the following purposes: Selectively voting for any candidate on and political ticket and thereupon automatically locking voting mechanism for the opposing candidate to preclude voting for a like office on more than one ticket; simultaneously adding one vote to the voted candidate's total as the vote is recorded on the unit which is provided for registering every vote cast in each respective individual political party; likewise actuating the grand totals provided in the machine for the purpose of indicating every vote that has been cast through the actuation of any vote-registering unit embodied in the voting machine.

An even further object of this invention is the provision of interconnected mechanism which functions to positively lock all vote-registering mechanisms for the individual candidates in a particular party when the registering mechanism indicating a vote for a straight ticket has been actuated.

Another object of the invention is the provision of a voting maching having a movable ballot upon which appears the names of all candidates, a vote registering unit for each candidate, and selective means movable to the proper vote-registering unit as the candidates name is presented to the voter; the movement of said ballot and selective means being accomplished by the voter by operating a single handle for that purpose.

A still further object of the instant invention is to provide a visible signal for the voter to indicate when a vote has been recorded in any party.

Minor objects of the invention are made clear only through an understanding of the specific form and combination of the parts necessary to construct a voting machine in accordance with this invention, and such objects and details of parts, as well as their specific function, will appear during the course of the following specification, referring to the accompanying drawings, wherein but the preferred form of the invention is illustrated, and wherein:

Fig. 11 is a fragmentary, vertical section through a part of the mechanism, taken on line XI—XI of Fig. 7, and looking toward the rear of the machine, and, Fig. 12 is a detailed view of the slidably mounted trigger-engaging member, one of which is carried by each rotatable main shaft.

Figure 1:
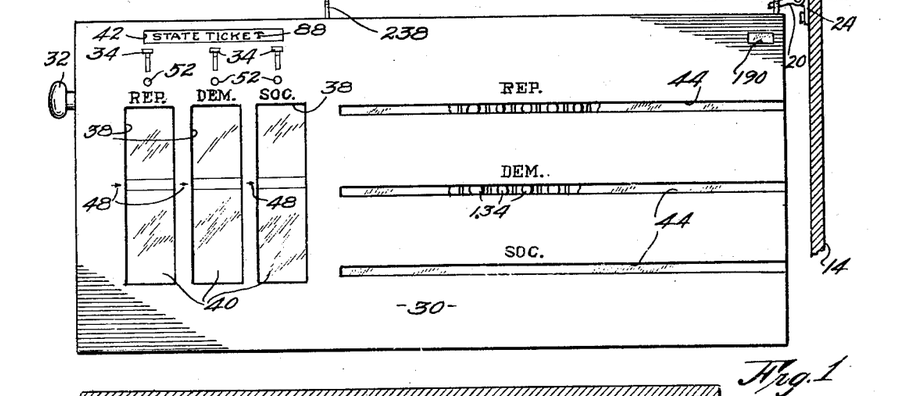
Figure 1 is a front elevation of a voting machine embodying the invention.
Figures 2, 3:
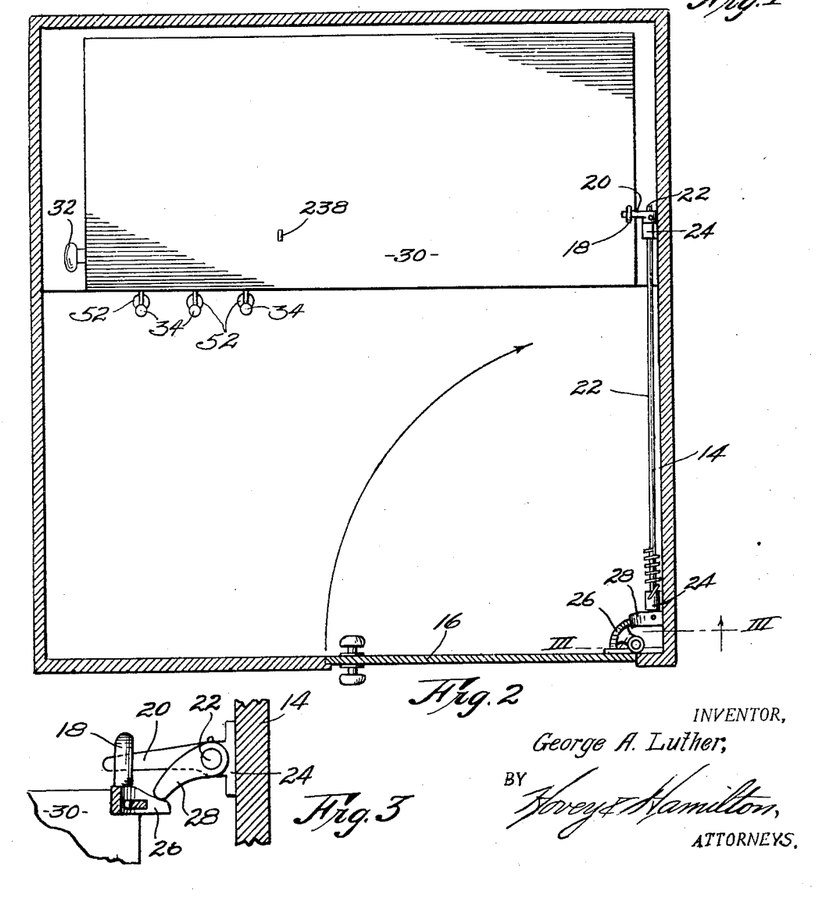
Fig. 2 is a top plan view of the same positioned within a voting booth, said booth being illustrated in section.
Fig. 3 is an enlarged, detailed, sectional view taken on line III—III of Fig. 2, showing, in a fragmentary manner, the way of connecting a booth door and the unlocking mechanism of the machine.

In the drawings enough mechanism has been illustrated to demonstrate the fact that the voting machine might be constructed to accommodate any number of political parties. Reference to Fig. 1 teaches that three parties are here specified, i. e. Republican, Democratic and Socialist. Similarly, each political ticket, or party, may be provided with as many candidates and candidate vote-registering units as necessary. The number illustrated and described herein is sufficient to fully disclose the relation and combination contemplated by the invention.

Like reference numerals are used to designate similar parts throughout all views of the drawings and the number 14 indicates a voting booth which may or may not be used in connection with the voting machine. In the event booth 14 is used, the door 16 thereof is operatively connected to the mechanism unlocking bar 18 hereinafter more fully described. it being sufficient at this point to state that a pull upward on bar 18 unlocks all parts of the machine so that vote registering may take place. In view of this, when door 16 of booth 14 is open to permit the exit of a voter, the machine is set for use for the next succeeding voter. To lift bar 18 by swinging door 16, the same is engaged by finger 20, mounted upon rotatable rod 22, journaled in bearings 24, secured to wall of booth 14. Incline 26 travels with door 16 and passes beneath and in contact with dog 28, which in turn is rigidly pinned to rod 22. When dog 28 is lifted by incline 26, rod 22 is rotated and bar 18 is raised by finger 20. Machines of this character are usually guarded by a doorkeeper at the door of booth 14 so that as door 16 is opened by a voter he cannot return to operate the machine.

Figure 5:
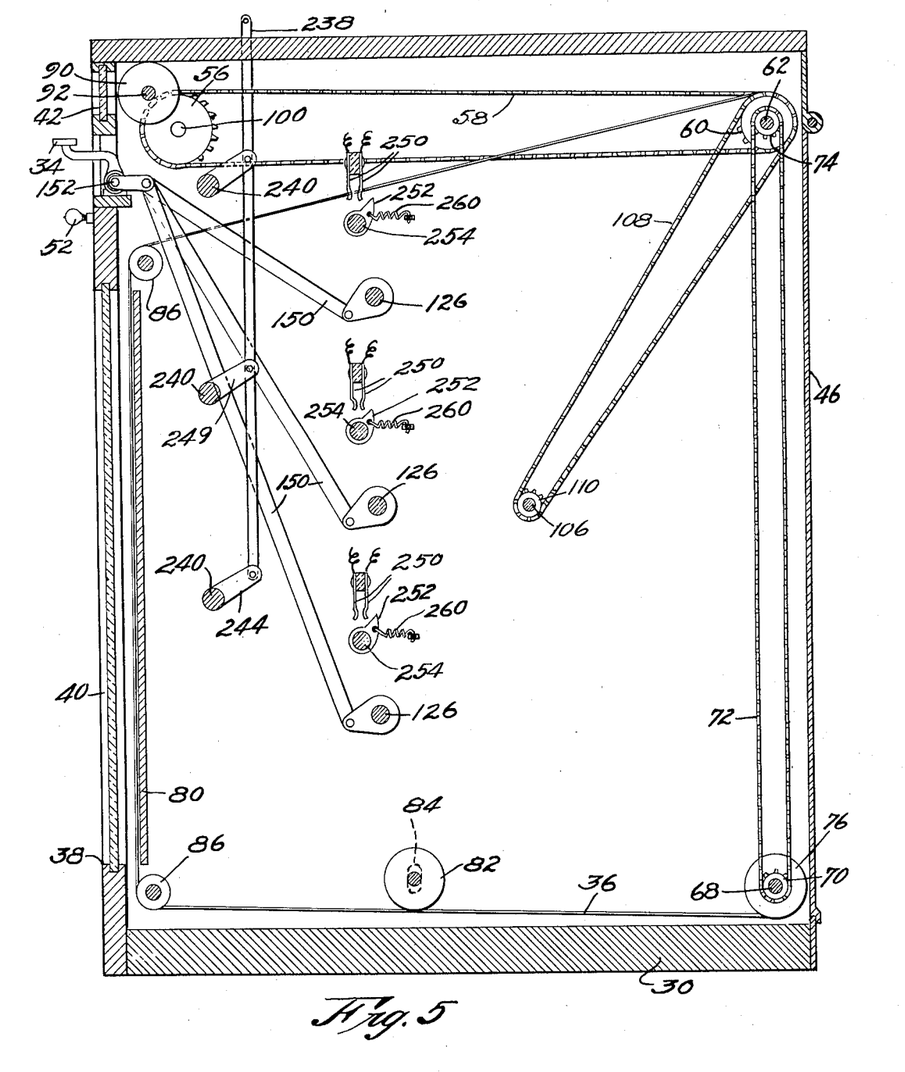
Fig. 5 is a vertical, cross section through the machine, taken along line V—V of Fig. 4, and looking in the direction of the arrow.

The voting machine proper is encased in a housing 30, from which projects the members to be operated by the voter. In the specific instance shown, operating handle 32 projects from the end of housing 30 and voting keys 34 project through slots formed in the front side of housing 30. To view the movable ballot strip 36, a series of windows 38 may be formed through the side of housing 30, which are covered with transparent material 40, behind which passes ballot 36, as illustrated in Fig. 5. Above keys 34 is a window 42, behind which appears the nature of the ticket which is presented behind windows 38 as handle 32 is operated. Longitudinal slots 44, likewise formed through the front of housing 30, allow a viewing of the sums which are presented by the registering units therebehind and within housing 30. An entrance door 16 may be built into housing 30 as a part thereof, preferably opposite the side which forms the windows and slots 38, 42 and 44.

Figure 4:
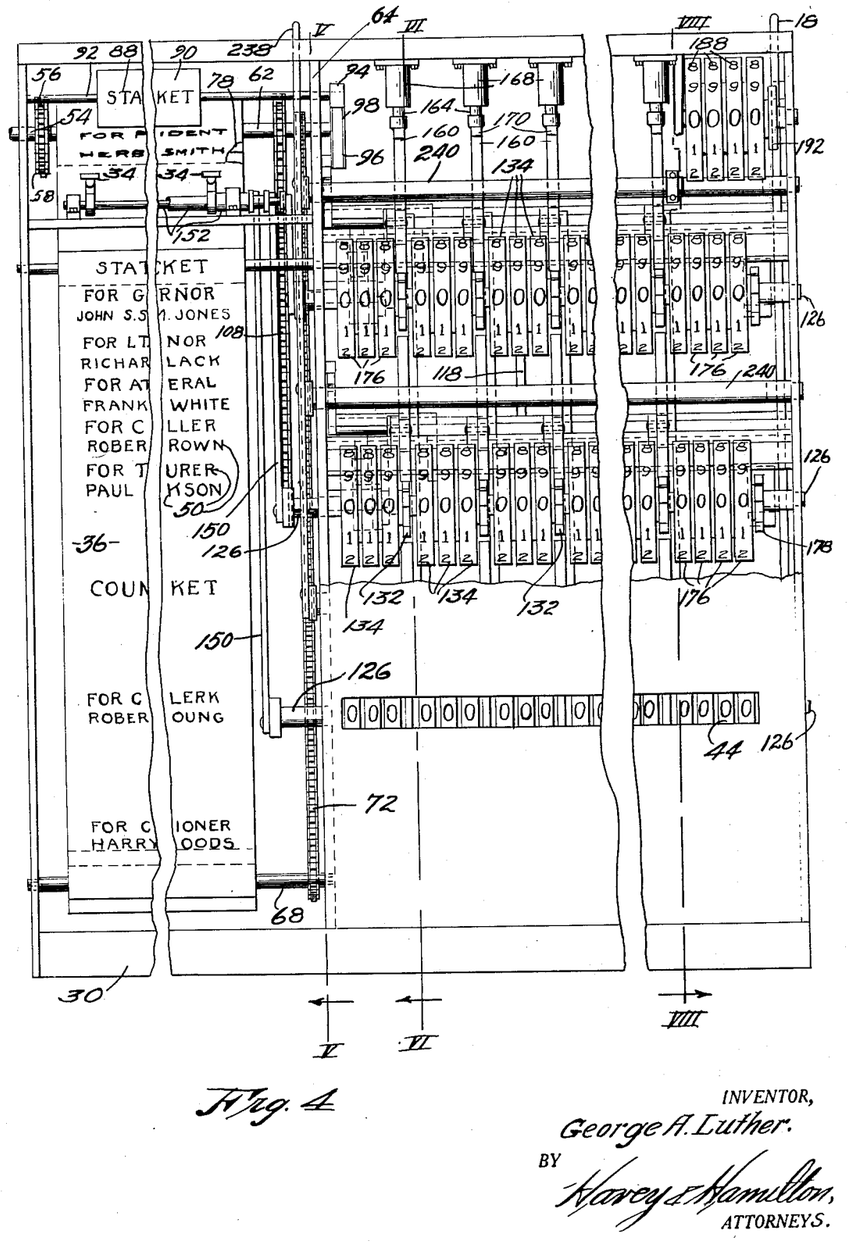
Fig. 4 is an enlarged, condensed, front elevation of the voting machine, having parts broken away for clearness.

The description just set down defines a machine as it is viewed by the voter. Upon entering booth 14 it is but necessary to operate handle 32, move ballot 36 to a point where the name of the desired candidate appears opposite indicators 48, and then vote for such candidate by depressing one of keys 34. Candidates names 50 are marked upon ballot 36 as indicated in Fig. 4 and when the selected candidate is voted by depressing key 34, a visible indication that the vote has been registered is actuated. This indicator may be in the form of an electric lamp 52, disposed adjacent the party name, as shown in Fig. 1.

The more important mechanical features of the voting machine are within housing 30 and include a number of distinct groups of mechanisms. In certain instances the vote-registering devices are duplicates, the elements being designed so that any number of groups may be embodied in a voting machine.

Handle 32 rotates a stub shaft 54, upon which is mounted for rotation sprocket wheel 56. Chain 58 is driven by the rotation of handle and wheel 32 and 56 respectively, and in turn drives sprocket 60, mounted upon shaft 62, which extends from one end of housing 30 to vertical partition 64 and therethrough to support roller 66. A shaft 68 below shaft 62 has a sprocket 70 thereon to co-operate with chain 72 and sprocket gear 74 mounted on shaft 62, whereby shafts 62 and 68 are rotated simultaneously upon movement of handle 32. Ballot 36 is wound upon spools 76 and 78 mounted upon shafts 62 and 68 respectively. That is to say, as ballot 36 is wound from spool 78, it is rewound upon spool 76 after passing behind windows 38. A guide apron 80 behind ballot 36 maintains a smooth surface and idler roller 82, journaled in slots 84, takes up any slack which might be present in ballot strip 36. Guide rollers 86 above and below apron 80 engage ballot 36 as shown in Fig. 5.

As ballot 36 is being moved in a manner just set down, the invention contemplates presenting behind window 42 the name of the particular ticket which is then present behind windows 38. These ticket names 88 are marked upon a drum 90, carried by shaft 92, extending through partition 64 with a friction wheel 94 mounted thereon. Turning friction wheel 94 will in turn rotate drum 90. This movement is timed and caused by an endless belt 96 which passes over roller 66, carried by shaft 62, and over another similar roller 98, carried by shaft 100. Belt 96 is driven by driven shaft 62 and, since roller 98 is in the same plane and very close to wheel 94, the use of raised surfaces 102 on the face of belt 96 will impart rotary movement to wheel 94 when such surfaces are moved between roller 98 and wheel 94. The distance between raised surfaces 102 is varied to properly time and establish working relation between drum 90 and ballot 36.

It is from shaft 62 that most of the parts of the machine are moved and in addition to those just mentioned, bevel gear 104, mounted upon stop shaft 106, is rotated by shaft 62 through the intermediacy of sprocket chain 108 and sprocket gear 110. An endless chain 112 extending longitudinally behind the vote-registering mechanism by wheels 114 is moved to and fro by bevel gear 116 in mesh with gear 104, which is driven as just mentioned. It is this chain 112 that directly engages the means which is actually set by the voter when selecting the party candidate or similar vote-registering unit. This means, of necessity, includes a bar 118 which is attached by coupling 120 to chain 112 for reciprocating movement therewith. Obviously, the distance of travel on the part of bar 118 is limited to the distance between wheels 114 which support chain 112.

Figure 10:
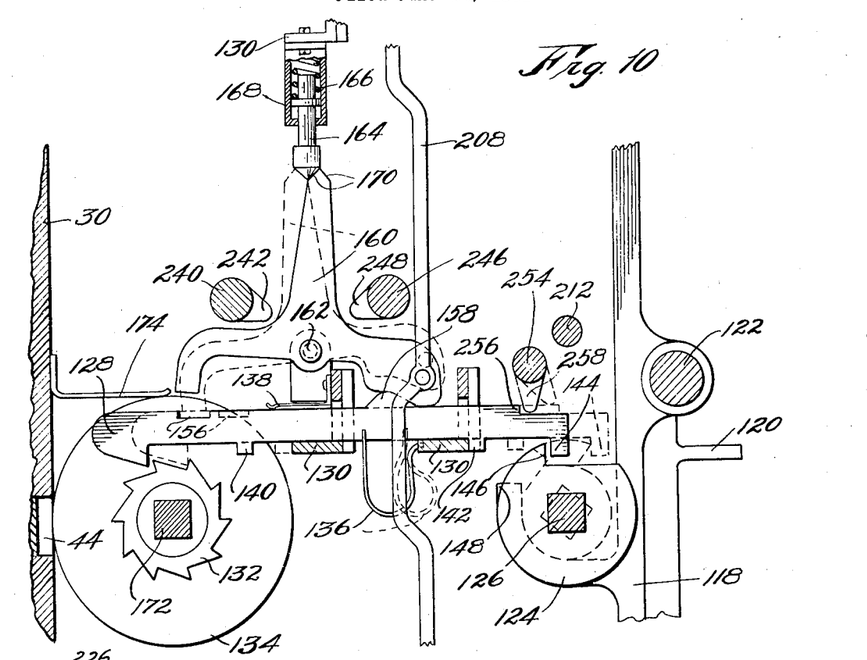
Fig. 10 is an enlarged, detail view of an individual candidate vote-registering unit and the parts which are associated therewith.

Invention is illustrated in the drawings to disclose a machine adapted for use when three political parties are present for consideration. The vote-registering mechanism for each party is identical and while the parts of each party mechanism are interconnected as later described, it is sufficient to mention in detail the manner in which three-party mechanism operates. Fig. 10 clearly illustrates the structure utilized for registering a vote at the registering mechanism for any individual candidate. Bar 118, mounted upon slides 122, carries trigger engaging members 124 along the rotatably mounted operating shafts 126 to operative relation with any one of triggers 128, which are slidably mounted for rectilinear, reciprocating, longitudinal movement by angle irons 130, extending entirely across the machine for the purpose. One end of trigger 128 operates ratchet 132 forming a part of each vote-registering and counting mechanism 134. A spring 136 yieldably maintains trigger 128 in a forward or set position, as illustrated in full lines of Fig. 10 and another spring 138 frictionally engages the upper edge of trigger 128 to further maintain the same in position.

A movement limiting lug 140, integral with trigger 128, strikes angle iron 130 when a vote has been registered on counting mechanism 134 by moving ratchet 132. An additional stop 142 limits the movement of trigger 128 in the opposite direction. The end of trigger 128 remote from counting mechanism 134 depends to present a lateral offset 144, behind which shoulder 146 of engaging member 124 is positioned when the same is disposed in place to actuate the particular trigger 128. That portion of shaft 126 upon which is mounted member 124 is squared so that when it is rotated, member 124 will turn therewith so as to move its shoulder 146 against offset 144, whereby to actuate the registering mechanism 134 as before specified. Member 124 is grooved annularly to receive bar 118 which is formed to present a hook 148 which precludes springing and displacement of the parts when operating force is imparted thereto. Shafts 126 are each joined to keys 34 by links 150 which are moved to rotate the respective shafts 126 when keys 34 are depressed around their pivotal support 152.

As before mentioned, there are three parties which may be voted by the machine shown, and accordingly three keys 34 are illustrated. A novel manner of mounting these keys is shown in Fig. 4, the telescoping pivoting members 152 being utilized to present a compact structure. Vote-registering mechanisms for like candidates on the different political party tickets are disposed one above the other and the candidates names on the ballot 36 are positioned side by side so that when for instance, the republican candidate for sheriff is presented at indicator 148, so likewise will the democratic and socialist candidate for sheriff be presented at windows 38, so marked. After the machine is thus set with the names positioned as mentioned, trigger engaging member 124 will be one above the other, ready to operate either of triggers 128, in accordance with the particular key 34 which is depressed.

Locking mechanism for the individual vote-registering units of the machine is provided to act upon trigger 128 for the purpose of precluding a voter from registering his vote more than once. The expedient for fulfilling this point of the invention is more clearly shown in Fig. 10. Trigger 128 has a notch 156 formed therein, as well as a cam face 158 projecting therefrom. An inverted T-shaped rocker arm 160 is pivotally supported as at 162 to angle iron 130, above trigger 128. Rocker arm 160 is in the position shown in full lines, Fig. 10, just before longitudinal rectilinear movement is imparted to trigger 128 by engaging member 124 for the purpose of registering a vote at unit 134. As trigger 128 is so moved, cam 158 strikes beneath that end of arm 160 to one side of pivotal point 162 and lifts rocker arm 160 about said pivotal point to force the end on the opposite side of point 162 down against trigger 128. As soon as unit 134 has been acted upon, spring 136 returns trigger 128 to its point of beginning. This action, of course, is dependent upon the operator releasing pressure upon the key 34 to allow shaft 126 and member 124 to likewise return to the point of beginning. When trigger 128 has returned, notch 156 receives the adjacent end of arm 160 and further movement cannot be imparted to trigger 128 until rocker arm 160 has been withdrawn from notch 156.

From the foregoing it is clear that there are two positive positions assumed by arm 160, and to assure a smooth, effective operation, means is provided for yieldably maintaining arm 160 in either one or the other of these positions. This means may include a plunger 164, actuated by spring 166, within a housing 168. The entire assembly is appropriately positioned in the path of travel of the free end of arm 160 which is angularly formed as at 170 to snap past center beneath plunger 164. All the registering units of the machine are supported by shafts, and squared shafts 172 are utilized to carry each party group which includes units for the individual candidate as well as registering units for the entire party.

While it is not necessary, a stabilizing spring 174 may be employed to bear against each unit 134.

Figures 8, 9:
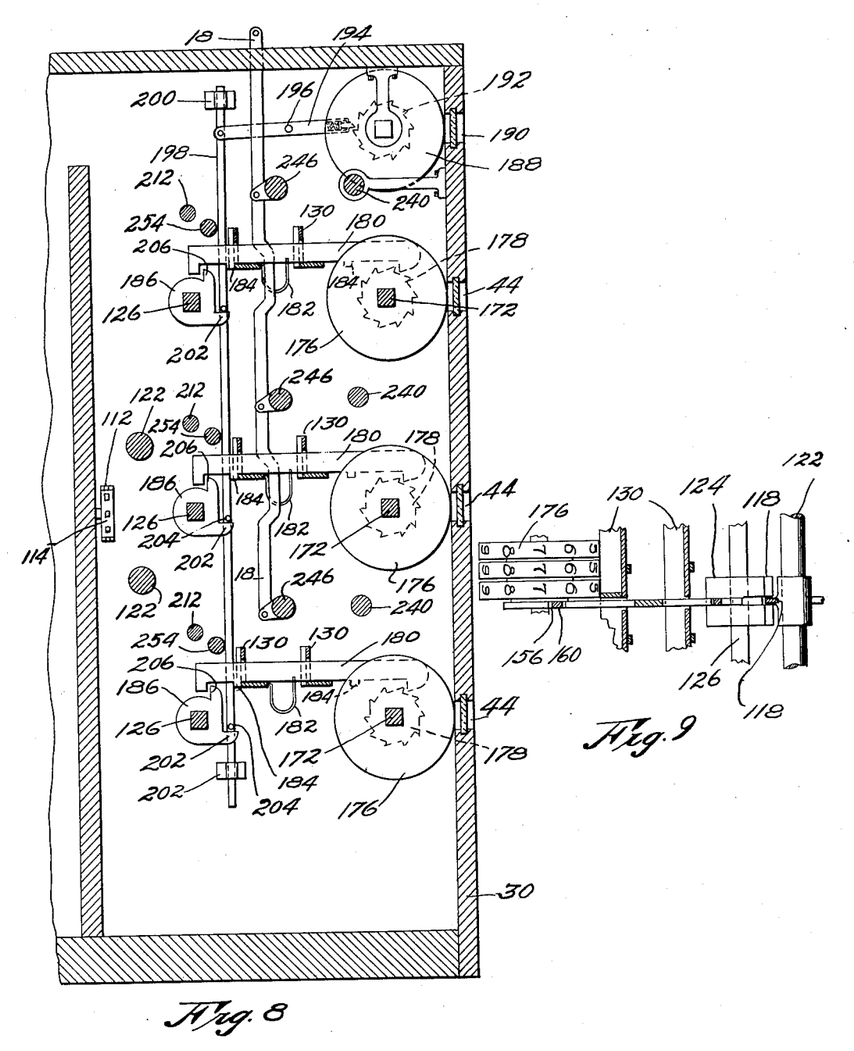
Fig. 8 is a fragmentary, vertical section taken along line VIII—VIII of Fig. 4, looking toward the end of the machine, and illustrating the grand totaler and the party vote-registering units.
Fig. 9 is a fragmentary, sectional view taken along line IX—IX of Fig. 7.

The machine illustrated includes three party group registering mechanisms; one for the republican party, one for the democratic party, and one for the socialist party. Looking at Fig. 4, the four registering units to the extreme right are those acted upon when a straight party ticket is voted. These straight-party registering units 176 are carried by shafts 172 and when an individual candidate is voted, the movement of shafts 126 causes a vote to be registered on the appropriate party counter because of the interconnections illustrated in Fig. 8. Ratchet 178, associated with each straight-party registering unit 176, is engaged by link 180 which is slidably carried by angle irons 130 in a manner similar to link 128. Spring 182 yieldably maintains link 180 in a set position and appropriate stops 184 serve to limit movement in both directions on the part of link 180. The link actuating member 186 in this particular instance is rigid to squared operating shaft 126 and upon each turn thereof link 180 is moved to register a vote. Thus when an individual candidate is voted by setting the mechanism as above mentioned and pressing key 34 of the desired party, besides registering a vote for the individual candidate selected, a vote is likewise registered at party registering unit 176 because of the apparatus just described. In addition to this point of advantage, the machine also embodies a grand totaling unit 188 positioned in the upper right hand corner of the machine where the total displayed thereby might be viewed through small window 190, formed through housing 30. Each time a vote is registered upon any individual candidate vote registering unit 176 or upon party vote registering units 176, record thereof is made on the grand totaling unit 188. Since operating shafts 126 are actuated by keys 34, it is through these shafts that registering action is transmitted.

Grand totaling unit 188 has a ratchet 192 associated therewith which is moved by lever 194 pivotally connected to the end of housing 30 by a pin 196. One end of lever 194 is pivotally connected to vertical rod 198, movably supported by bearings 200 and having a laterally extending pin 202 adjacent each of the aforesaid link actuating members 186. A shoulder 202 engages pin 204 when shaft and member 126 and 186 are rotated. This action transmits registering movement to grand totaling unit 188 simultaneously with the transmittal of a similar action to the appropriate party vote registering unit 176. It is obvious that the upright shoulder 206 engages the downturned end of link 180 to perform such a function.

Figure 7:
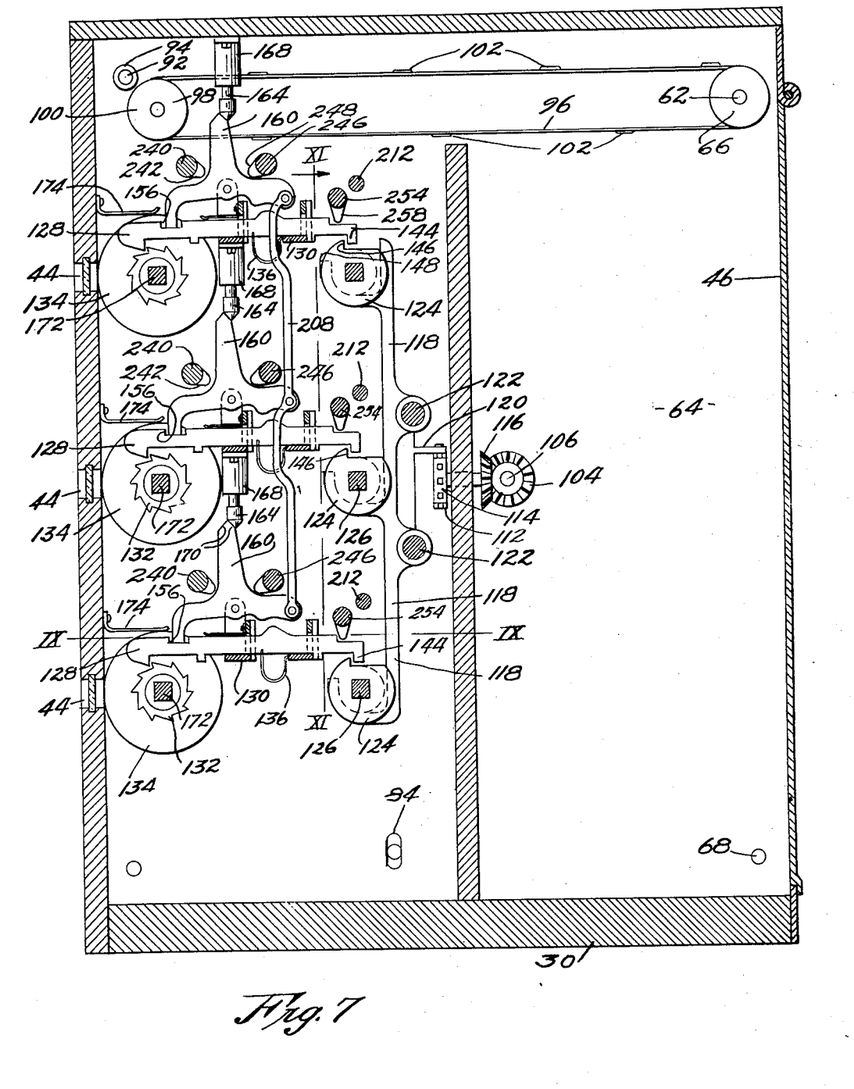
Fig. 7 is still another vertical section through the machine, illustrating a typical group of mechanisms which may be used in connection with vote-registering units of the individual candidate.

Reverting now to the locking feature which has previously been described for the individual candidate voting mechanism. It is one of the important points of this invention that when a vote has been registered for one candidate, vote registering mechanism for the same candidate on opposing party tickets be locked against rotation. A rocker arm 160 is associated with each trigger 128 throughout the entire machine so far as the registering units 134 for individual candidates are concerned. Reference to Fig. 7 might be had to illustrate the fact that vote-registering units 134 for like offices on opposing political parties are positioned one above the other. When bar 118 is moved to the set position to select an officer, the particular officer selected is voted for only when the appropriate party key 34 is depressed. That is to say, when mechanism is set, the voter must be cautious to depress the proper political key 34 or the particular officer on the wrong political party will be voted. When once a key 34 is depressed however, one of the alined registering units 134 will be actuated and immediately locked by rocker arm 160 in a fashion as before set down. A connecting rod 208 joining the alined rocker arms 160 imparts locking movement to arm 160 when any one of the three is moved as described. Through this expedient it is obvious that all vote registering units for the opponents to the candidate voted will be secured against actuation and only one candidate for each office may receive a vote.

Figure 6:
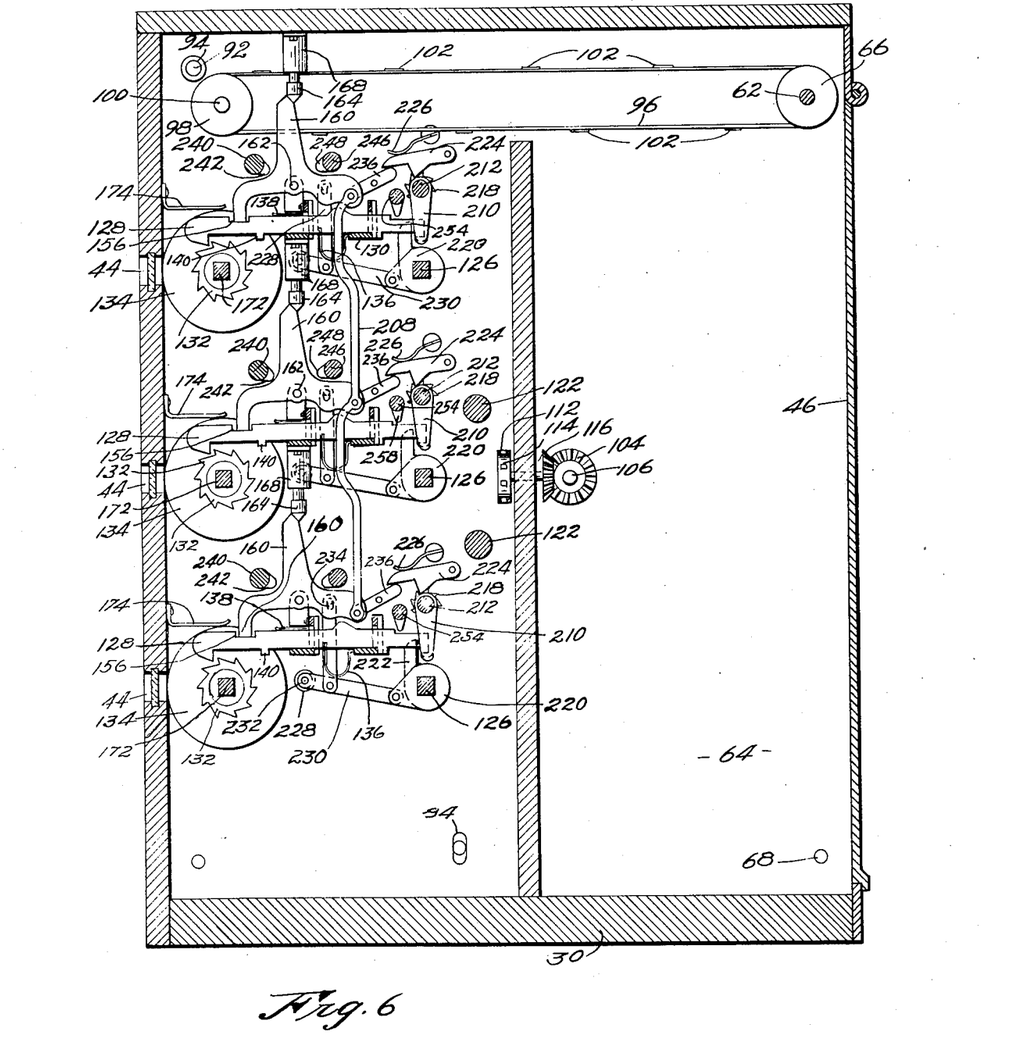
Fig. 6 is another vertical, cross section through the voting machine, taken approximately along line VI—VI of Fig. 4.
Figures 11, 12:
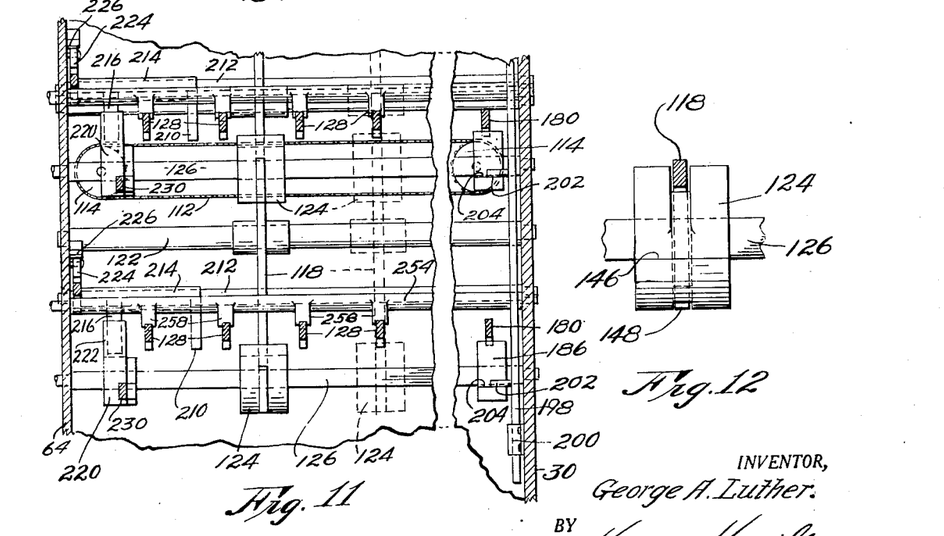

Oftentimes it is desired to register a vote for the entire party without selecting the individual candidates. To do this, bar 118 is moved to an appropriate set of vote registering units 134 which are similar to units 176, but have been previously set aside for registering straight party votes. This party vote registering unit 134 is preferably close to the left end of the group of units as shown in Fig. 4, and when bar 118 is moved into the set position behind these party vote registering units, it is within a zone between partitions 64 and a finger 210 which it cannot leave after a party vote has been registered because finger 210 swings out in the path of travel of bar 118 to preclude its movement out of the party voting position when shaft 126 is turned to register the party vote. There is a straight party vote registering unit for each party at the left (Fig. 4) and a finger 210 for each set of said registering units and, since all act the same, it is necessary to describe the function of but one. Finger 210 is mounted upon shaft 212 and is integral with a sleeve 214 extending along shaft 212 and rotatably mounted thereon. (See Fig. 11.) A branch 216 from sleeve 214 extends laterally therefrom at a point spaced from finger 210 and intermediate said finger and ratchet 218 formed upon the end of sleeve 214 opposite from finger 210. Branch 216 lies in the path of travel of a fitting 220 rigidly affixed to shaft 126. A lateral projection 222 integral with fitting 220 strikes branch 216 when shaft 126 is rotated. Such movement swings finger 210 from its normal position illustrated in Fig. 6, into the path of travel to bar 118 to preclude its being moved longitudinally along slides 122 to carry member 124 to a position where registering an individual vote by movement of trigger 128 is possible. A pivotally mounted dog 224 engages ratchet 218 and is yieldably pressed into engagement therewith by a suitable spring 226. As shown in Fig. 6, ratchet 218 is rotatable in one direction only when dog 224 is thereagainst, and the dog 224 must be held out of engagement to allow rotation in the opposite direction. Since shaft 126 is turned each time an individual candidate is voted, it is obvious that upon voting the straight party, fitting 220 will be turned by shaft 126, causing projection 222 to strike branch 216 which swings finger 210 around in the path of travel of bar 118, all of which will positively guard against moving bar 118 to vote an individual candidate until the parts of the machine are again set for a new voter. Rocker arm 160 is swung past plunger 164 and to the locked position as shown in Fig. 6 by links 228 and 230, interconnected as shown. This action takes place when shaft 126 is actuated by pressing the related key 34.

Link 230 is pivotally mounted as at 232 and joins fitting 220 in a pivotal manner. Link 228 is pivoted to link 230 intermediate the ends thereof and joins rocker arm 160 through a pin and slot construction 234 which permits further movement on the part of shaft 126 without affecting arm 160. That is to say, after rocker arm 160 has been moved to the locked position by the upward force of link 228, link 228 may again move up and down without actuating arm 160. Finger 210 is held out in the locked position by ratchet 218 and dog 224 until dog 224 is raised from engagement with ratchet 218 to allow finger 210 to drop by gravity into the position illustrated in Fig. 6. The free end of pivotally mounted dog 224 rests upon the free end of a link 236 which is pivotally connected to partition 64 intermediate its ends. The other end of link 236 is pivotally attached to rocker arm 160. This pivotal connection between link 236 and arm 160 must be a loose fit to permit free movement of said parts about their pivotal points. This assembly causes dog 224 to be raised away from ratchet 218 when rocker arm 160 is moved back to the set or its normal unlocked position. Manifestly, connecting rod 208 imparts like movement to all parts of the mechanism which it interconnects and an action upon any group of party mechanism will be imparted to similar parts of the other groups.

Means has been provided to lock all vote registering units from exteriorly of the machine. A locking bar 238 projects from housing 30 and is connected to a laterally extending shaft 240, one of which is provided for each group of registering units which is provided with rocker arms 160. Shaft 240 is formed with a lateral lug 140 which, when shaft 240 is turned, bears against arm 160 to force it past plunger 164 and into a locked position. Means should be provided for normally maintaining bar 238 in the raised position and lugs 242 out of engagement with arms 160. Links 244 connect bar 238 with shafts 240, as shown in Fig. 5. Similar unlocking mechanism is also provided which may be actuated by the election judge or, as previously set down, by the movement of door 16 of booth 14.

Unlocking bar 18 projects from housing 30 and is connected with shafts 246 extending along beside rocker arms 160 to move the same and all its interconnected mechanism to an unlocked or set position. A cam 248 is formed upon shaft 246 to bear against arm 160 as shaft 246 is rotated by the movement of bar 18.

Whenever any one of operating shafts 126 is rotated to register a vote, signal in the form of an electric light 52 is presented to the voter to indicate the exact ticket selected and voted. Spaced apart electrical contacts 250 are supported adjacent a shaft 254 and in the path of travel of an ear 252 carried thereby. This shaft 254 is a part of each party vote registering mechanism and extends along above triggers 128. As any one of triggers 128 is moved, as previously specified, a shoulder 256 (see Fig. 10) formed thereon strikes a laterally projecting lug 258 formed on shaft 254 to rotate said shaft to a point where ear 252 will move together electrical contacts 250. When trigger 128 has been returned to the point of beginning by spring 136, shaft and its lugs 254 and 258 respectively, will be brought back to the set or starting position by spring 260, one end of which is fixed to ear 252. Through such combination light 52 will be burning so long as key 34 is depressed to hold trigger 128 back to the registering position through the intermediacy of link 150, shaft 126 and trigger engaging member 124.

The machine just described and illustrated in the drawings embodies parts sufficient to fulfill the objects of the invention and while an unending number of modifications might be built into a voting machine such as contemplated by the broad scope of the invention, it is sufficient to teach the basic concepts that the preferred form made clear herein be understood.

Upon entering booth 14 through door 16, the voter automatically conditions the machine to receive his votes as he properly manipulates the parts exposed for the purpose. Such conditioning is accomplished by parts 18, 246 and 248 which force all arms 160 to the "set" position shown in full lines in Fig. 10. Turning handle 32 not only exposes to view, at window 42, the ticket being voted, but also exposes the names of the candidates at windows 38. When the names of opposing candidates appear at indicators 48, the party name above each window 38 will designate the ticket on which the candidate is running and will also locate the key 34 which is to be depressed to vote for that party candidate.

If the voter desires to register a straight party vote for the entire group of Republican candidates, on the State ticket, handle 32 is turned until chains 58, 108 and 112 move bar 118 along slides 122 to a zone behind straight party vote registering unit 132 that is between partition 64 and finger 210. Depressing key 34 positioned over "Rep." will turn shaft 126 and its trigger engaging member 124 so that the straight party registering unit 134 is actuated and, through actuating member 186 and its associated parts, a vote is registered on the grand totaling unit 188. All straight party voting units are moved to a locked position and bar 118 cannot be moved along slides 122 out of the aforementioned zone behind the straight party registering units. Signal light 52 over the republican heading will burn until the machine is cleared.

In voting for individual candidates, the action is the same for each, and when, for instance, a vote is registered for republican candidate for sheriff, the mechanism is locked against again voting for sheriff on any ticket. Fig. 7 illustrates how when, after one trigger 128 has been moved to register a vote, all triggers and associated arms 160 are in locked position until the entire machine is again cleared. Each time a key 34 is depressed either for a straight party vote or an individual candidate, the grand total unit 188 registers. Likewise each time a vote is registered by depressing any one of keys 34, the appropriate signal 52 is operated because any complete movement of a key, when a trigger 128 and a member 124 are in proper position, will cause shaft 254 to rotate and close contact points 250.

Registering a vote for any individual candidate will swing one of fingers 210 into a position where it blocks the movement of bar 118 from being moved to a point where a straight party vote may be registered just the same as it did to preclude movement from the straight party voting zone.

The entire registering mechanism may be locked by moving locking bar 238 downwardly to turn shafts 240 having lugs 242 to engage arms 160. (See Figs. 5 and 7.)

Having thus described the invention, what is claimed as new and desired to be secured by Letters Patent is:

1. In a voting machine, a plurality of individual candidate vote-registering mechanisms, arranged in series by party ticket; a party vote-registering mechanism; setting means common to both mechanisms and movable from one to the other whereby to render operative the selected mechanism; and a manually controlled operating means movable to register a vote at the location of said setting means said setting mechanisms being slidably mounted for rectilinear reciprocation behind said registering mechanisms.

2. In a voting machine, a plurality of individual candidate vote-registering mechanisms, arranged in series by party ticket; a party vote-registering mechanism; setting means common to both mechanisms and movable from one to the other whereby to render operative the selected mechanism; manually controlled operating means movable to register a vote at the location of said setting means; and apparatus movable to effective position by said operating means as the vote-registering mechanisms are actuated to preclude movement of the said setting means to or from the series of individual candidate vote-registering mechanisms after the machine has been operated the first time after being cleared for a voter.

3. In a voting machine, a plurality of individual candidate vote-registering mechanisms; setting means common to all of said mechanisms and manually movable to position adjacent thereto; a movable ballot having indicia thereon to identify the individual candidates; and a stationary pointer adjacent said movable ballot, said ballot and setting means being simultaneously movable and timed whereby upon arrival of a candidate indicia at said stationary pointer said setting means will be operatively positioned adjacent the registering mechanism for that particular candidate, said setting means being mounted for slidable, rectilinear, reciprocation as said ballot is moved transversely to the direction of travel of said setting means.

4. In a voting machine, a plurality of individual candidate vote-registering mechanisms, arranged in series by party ticket; party vote-registering mechanism for each party; setting means movable to position adjacent the selected registering mechanism; manually controlled operating means movable to register a vote at the location of said setting means; and means to lock all unselected vote-registering mechanisms of the said series, operable upon movement of said manually controlled operating means to register a vote of the selected vote-registering mechanism.

5. In a voting machine, a plurality of individual candidate vote-registering mechanisms; a plurality of party vote-registering mechanisms; selective setting means common to all mechanisms; a ballot having candidate names thereon movable to indicate the position of said setting means; a ticket designating member; and actuating means common to said setting means, ballot, and ticket designating member, movable by the voter when selecting a candidate.

6. In a voting machine, a plurality of individual candidate vote-registering mechanisms, arranged in series by party; a plurality of party vote-registering mechanisms; an operating trigger adjacent each of said registering mechanisms; a shaft disposed near each series of individual candidate registering mechanisms and extending to the registering mechanism, for the party vote of each individual series; a trigger engaging member and setting means slidably mounted on said shaft to carry said trigger engaging member to an operative position.

7. In a voting machine, a plurality of individual candidate vote-registering mechanisms, arranged in series by party; a plurality of party vote-registering mechanisms; an operating trigger adjacent each of said registering mechanisms respectively; a rotatable shaft and a stationary shaft near the triggers; a trigger engaging member slidably mounted on said rotatable shaft and for rotation therewith; and setting means slidably mounted on the stationary shaft and joining said engaging member to move the same longitudinally therealong to the selected trigger.

8. In a voting machine, a plurality of vote-registering mechanisms divided into party group, each party group having a registering unit for each candidate of the party group and a registering unit for the entire party; a longitudinally reciprocating operating trigger adjacent each of said registering mechanisms respectively; and a rocker arm movable to the trigger locking position by said trigger as the same is actuated to register a vote on its respective vote-registering mechanism, said trigger and arm each having a cam face disposed for interengagement when the trigger is at one end of its path of travel, whereby to rock said arm when moved toward the other end of said path.

9. In a voting machine, a plurality of vote-registering mechanisms divided into party groups, each party group having a registering unit for each candidate of the party group to form candidate groups and a registering unit for the entire party; an operating trigger adjacent each of said registering mechanisms respectively; said triggers each being mounted for longitudinal rectilinear reciprocating movement; means to so move said triggers; a rocker arm associated with each trigger movable to a trigger locking position by the associated trigger as the same is moved to register a vote; and links interconnecting the rocker arms of similar candidate triggers in each party group whereby the locking position is assumed by all linked arms forming the candidate group upon movement of any one.

10. In a voting machine, a plurality of vote-registering mechanisms divided into party groups, each party group having a registering unit for each candidate of the party group and a registering unit for the entire party; an operating trigger adjacent each of said registering mechanisms respectively; said triggers each being mounted for longitudinal rectilinear reciprocating movement; means to so move said triggers; a pivotally mounted rocker arm associated with each trigger movable to a trigger locking position by the associated trigger as the same is moved to register a vote; and means to yieldably maintain said rocker arm in either the locked or unlocked position.

11. In a voting machine, a plurality of vote-registering mechanisms divided into party groups, each party group having a registering unit for each candidate of the party group and a registering unit for the entire party; an operating trigger adjacent each of said registering mechanisms respectively; said triggers each being mounted for longitudinal rectilinear reciprocating movement; means to so move said triggers; a pivotally mounted rocker arm for each trigger movable to a trigger locking position by the associated trigger as the same is moved to register a vote; means to yieldably maintain said rocker arm in either the locked or unlocked position, said rocker arm being pivoted intermediate the ends of said trigger and overlying a portion thereof on each side of said pivoted point; a notch formed in said trigger on one side of said pivotal point; and a cam face formed by said trigger on the other side of said pivotal point, said cam rocking said arm to move a portion thereof into said notch as the trigger is moved to register a vote.

12. In a voting machine, a plurality of vote-registering mechanisms divided into party groups, each party group having a registering unit for each candidate of the party group and a registering unit for the entire party; an operating trigger adjacent each of said registering mechanisms respectively; and means to selectively move any one of said triggers including a slidably mounted bar; means to move said bar to the selected position; a plurality of rotatable shafts positioned parallel to the plane of movement of said slidably mounted bar; and trigger engaging members carried by said rotatable shafts for movement therealong as said bar is moved.

13. In a voting machine, a plurality of vote-registering mechanisms divided into party groups, each party group having a registering unit for each candidate of the party group and a registering unit for the entire party; an operating trigger adjacent each of said registering mechanisms respectively; and means to selectively move any one of said triggers including a slidably mounted bar, a manually operated endless belt to move said bar to the selected position, and a plurality of trigger engaging members carried to and from the selected position by said slidably mounted bar.

14. In a voting machine, a plurality of vote-registering mechanisms divided into party groups, each party group having a registering unit for each candidate of the party group and a registering unit for the entire party; an operating trigger adjacent each of said registering mechanisms respectively; and means to selectively move any one of said triggers including a slidably mounted bar; means to move said bar to the selected position, a plurality of rotatable shafts, a trigger engaging member carried by each of said shafts, a member interconnecting said bar and trigger engaging member whereby the same move together, and a shoulder formed on said engaging member to carry said trigger when the shaft and trigger engaging member are rotated.

15. In a voting machine, a plurality of vote-registering mechanisms divided into party groups, each party group having a registering unit for each candidate of the party group and a registering unit for the entire party; an operating trigger adjacent each of said registering mechanisms respectively; a rotatable shaft associated with each party group; a stationary trigger engaging member carried by said shaft to operate the registering unit for the entire party as the shaft is rotated; a trigger engaging member slidably mounted on said shaft to selectively operate one of the triggers of the candidate registering units, and means to move said last mentioned trigger engaging member to the selected position.

GEORGE A. LUTHER.